INVENTOR.
EARL PATTERSON, JR.
BY
Wayne B. Easton
ATTORNEY

United States Patent Office 3,309,999
Patented Mar. 21, 1967

3,309,999
DRIVE MECHANISM FOR GEROTOR GEAR SET
Earl Patterson, Jr., Excelsior, Minn., assignor to Char-Lynn Company, Minneapolis, Minn., a corporation of Minnesota
Filed June 21, 1965, Ser. No. 465,343
6 Claims. (Cl. 103—130)

This invention relates to drive mechanisms having general utility and also specific utility for particular types of fluid pressure motors and pumps.

The drive mechanism of the present invention is especially adapted for use with a gerotor type gear set which comprises a ring gear having internal teeth and a meshing star gear having at least one less tooth than the ring gear.

It is characteristic of gerotor gear sets that the star gear has a combined rotational and orbital movement. In some devices having gerotor gear sets there may be a first rotatable member such as a drive shaft which is rotatable in synchronism with the rotational movement of the star and a second rotatable member such as a valve which is rotatable in synchronism with the orbital movement of the star. It is a main object of the present invention to provide a new and improved drive mechanism having general utility and also specific utility for gerotor devices of this type.

Other objects and advantages will become apparent from the following specification, appended claims and attached drawing.

Figure 1:
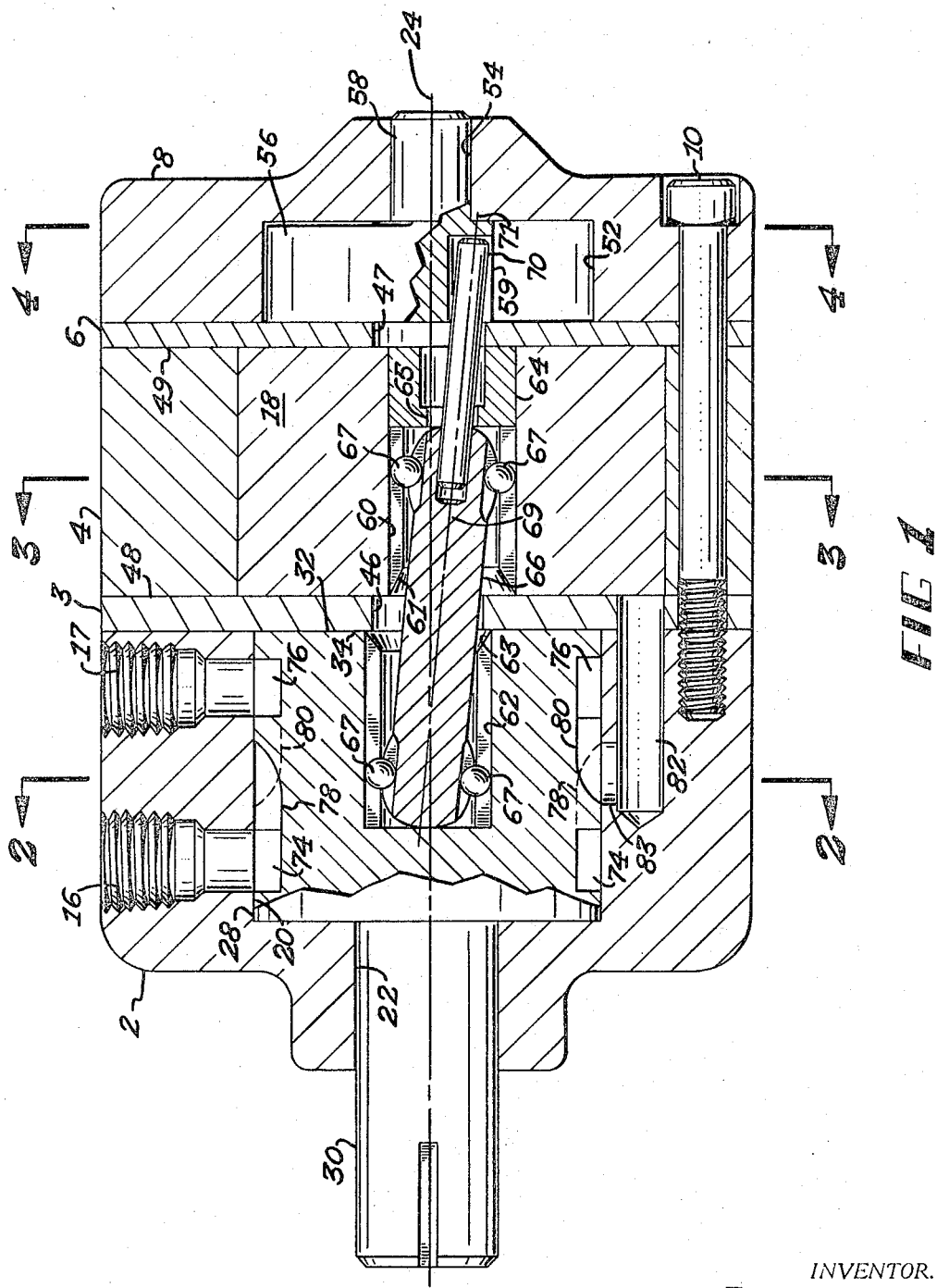
FIG. 1 is a longitudinal sectional view of a fluid pressure motor or pump embodying the invention and taken on line 1—1 of FIG. 2.

The invention is illustrated herein as being embodied in a fluid pressure device which is operable as a pump or a motor.

In the fluid pressure motor or pump illustrated there is provided a casing or housing made of several annularly and cylindrically shaped sections which are a valve casing section 2, a valve plate 3, a gerotor casing section 4, a retainer plate 6 and a counterweight casing section 8. Casing sections 2, 3, 4, 6 and 8 are held together in axial alignment by a plurality of circumferentially spaced bolts 10.

When the drive mechanism of the present invention is used for a fluid pressure device such as the pump or motor illustrated herein, the casing referred to above serves as a support or frame for certain rotatable members which are essential to the invention. The word "frame" as used in the appended claims thus means a casing if the invention is embodied in a fluid pressure device or other supporting means if it is embodied in some other type of device.

Casing section 2 is provided with inlet and outlet ports 16 and 17 which would be reversed for operation of the pump or motor in the opposite direction.

The shape of gerotor casing section 4 is generally cylindrical and annular and has a plurality of internal teeth. An externally toothed star member 18 having at least one tooth less than casing section 4, which may be referred to as a ring member 4, has the teeth thereof in meshing engagement with the teeth of ring member 4. Star member 18 partakes of a hypocycloidal movement and travels in an orbit about the axis of ring member 4.

Valve casing section 2 has a generally cylindrical shape and has an axially extending bore 20 and a counterbore 22, both of which bores are concentric relative to the axis 24 of ring member 4. Inlet and outlet ports 16 and 17 communicate with the interior of bore 20 as shown in FIG. 1. Rotatably disposed in valve casing section 2 is a combination valve and shaft member which comprises a cylindrically shaped valve 28 which is rotatably supported in bore 20 and a shaft 30 which is rotatably supported in counterbore 22. Shaft 30 is an input shaft if the device is used as a pump and an output shaft if the device is used as a motor. The axial length of valve portion 28 is equal to the axial length of bore 20 so that the radial surface 32 of valve portion 28 is in slidable engagement with the adjacent radial surface 34 of valve plate 3.

Figure 3:
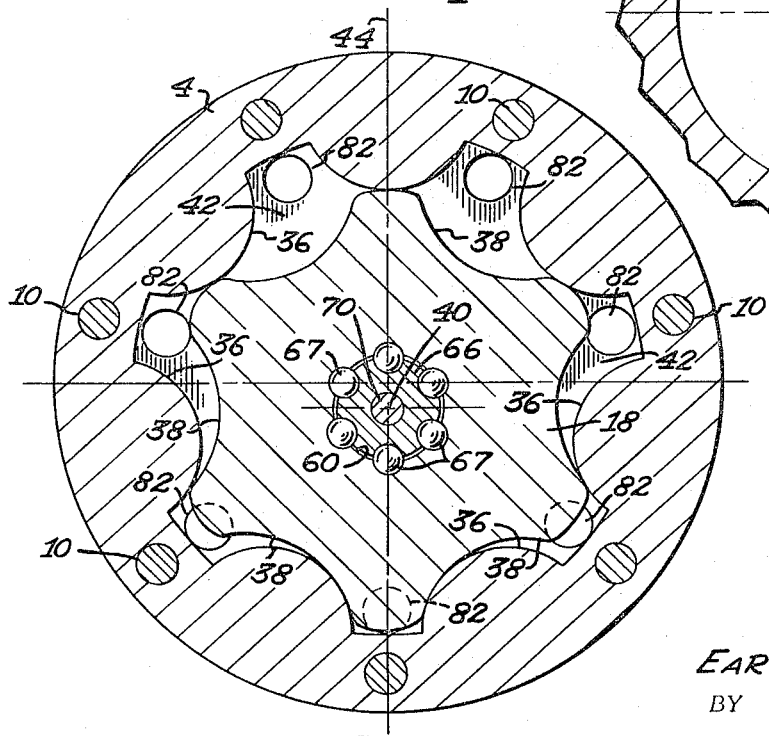
FIG. 3 is a transverse sectional view taken on line 3—3 of FIG. 1.

With reference to FIG. 3, the gerotor casing section 4, which in effect is the ring member 4, has a plurality of internal teeth 36. Externally toothed star member 18, having at least one less tooth, teeth 38, than ring member 4, is disposed eccentrically in the chamber or space formed and surrounded by ring member 4. Star member 18 is movable orbitally relative to the ring member 4 with the axis 40 of star member 18 being movable in an orbital path about the axis 24 of ring member 4. During orbital movement of star member 18 the teeth 38 thereof intermesh with the ring member teeth 36 in sealing engagement to form expanding and contracting cells 42 which are equal in number to the number of teeth 38 of star member 18.

With further reference to FIG. 3, a vertical centerline 44 incidentally represents the line of eccentricity for the star member 18 for that particular position of the star member relative to the ring member 4. During orbital movement of the star member 18, and assuming the orbital movement is clockwise, the cells 42 on the right side of the line of eccentricity would be expanding and the cells 42 on the left side would be contracting. If the device is used as a motor, fluid under pressure is directed to the expanding cells and exhausted from the contracting cells. If the device is used as a pump, fluid is sucked into the expanding cells and delivered under pressure from the contracting cells. The valving arrangement which facilitates the pumping or motor action will be described further on herein.

Plates 3 and 6 have bores 46 and 47 which are concentric relative to the axis 24 and are small enough so that the resulting annular faces 48 and 49 which abut gerotor casing section 4 form sides for the gerotor chamber so that the expanding and contracting cells 42 formed between the teeth of the gerotor star and ring members 18 and 4 will be closed for all orbital positions of the star member 18.

Casing section 8 is annular in shape with a bore 52 and a counterbore 54 being concentric to ring axis 24. A generally pie shaped counterweight 56 having a shaft portion 58 is disposed in bores 52 and 54 with shaft portion 58 being journaled in bore 54. Counterweight 56 has, diametrically opposite the center of gravity thereof, a radially extending slot 59 having parallel walls which extend parallel to the ring member axis 24.

Star member 18 has a bore 60 which is concentric relative to the teeth 38 thereof and a portion of the length of bore 60 is provided with a plurality of circumferentially arranged, axially extending teeth or splines 61. A bore 62 of valve 28, which is concentric relative to axis 24 and communicates with the bore 60 of star 18, also has a plurality of circumferentially arranged, axially extending teeth or splines 63. The splines 61 and 63 are formed so that in section, as may be viewed in FIGS. 2 and 3, the spaces or recesses between the splines are semicircular or arc shaped.

An annularly shaped abutment spacer ring 64 is disposed in star bore 60 between the ends of splines 61 and retainer plate 6. Ring 64 has an annular flange 65 which will be referred to further on.

A shaft 66, extends between and mechanically connects star 18 and valve 28 in driving relation. Shaft 66 is of a length so that the left end thereof abuts the bottom of valve bore 62 and the right end thereof abuts the flange 65 of spacer ring 64. Each end of shaft 66 is generally spherically shaped with the left end of the shaft having an effective diameter which is the same as the internal diameter of valve splines 63 and the right end of the shaft having an effective diameter which is the same as the internal diameter of star splines 61. Each end of shaft 66 is provided with a series of splines equal in number respectively to the plurality of star splines 61 and the plurality of valve splines 63. Each series of shaft splines is formed so that in section, as viewed in FIGS. 2 and 3, the spaces or recesses between the splines are semicircular or arc shaped and are of the same diameter respectively as the recesses between the splines 61 and 63. As viewed in FIGS. 2 and 3, the mating spline recesses between shaft 66 and valve 28 and between shaft 66 and star 18 are generally circular in section. A plurality of balls 67 are disposed between the spline recesses which function to transmit driving forces or torque between shaft 66 and the star and valve members 18 and 28.

Star member 18 is eccentrically disposed relative to ring member 4, as mentioned above, and the shaft 66 is thus always in a cocked or tilted position relative to valve 28, which has the same axis 24 as ring member 4, and to the axis 40 of star member 18. In operation a star member 18 having six teeth will make one revolution about its own axis 40 for every six times the star member orbits in the opposite direction about the axis 24 of the ring member 4. Thus, the right end of shaft 66 has both orbital and rotational movement in common with the star member 18 while the left end of the shaft 66 has only rotational movement in common with valve 28.

The ball and spline connections between shaft 66 and valve 28 on the one hand, and between shaft 66 and star member 18 on the other hand, are forms of universal joints which permit the shaft 66 to have the motion described above. When the device is utilized as a pump, star member 18 will be gyrated by a turning force applied to shaft 30 which is transmitted to star member 18 through the shaft 66. When the device is used as a motor, the force created by the rotation of star member 18 about its own axis 40 will be transmitted through shaft 66 to shaft 30 to cause turning of shaft 30.

As mentioned above, star 18 is eccentrically disposed relative to ring 4 and has orbital movement relative to ring 4 with star axis 40 having an orbital path about ring axis 24. This orbital movement of star 18 results in a radial force which rotates about ring axis 24 at the orbital speed of star 18. Counterweight 56 functions to counterbalance the radial force when it is rotated by shaft 66. Shaft 66 has a central bore concentric with the axis 69 thereof in which shaft extension or shaft portion 70 is rotatably disposed. Shaft extension 70, which may be either fixedly or rotatably mounted in the bore of shaft 66, extends into the slot 59 of counterweight 56 and the diameter thereof is substantially equal to the width of the slot 59. With this construction the center of gravity of counterweight 56 is on the diametrically opposite side of axis 24 relative to the center of gravity of star 18. Shaft extension 70 acting in slot 59 causes counterweight 56 to be rotated in synchronism with the orbital speed of star 18 and counterbalance the radial force created by the orbiting motion of star 18.

Figure 4:
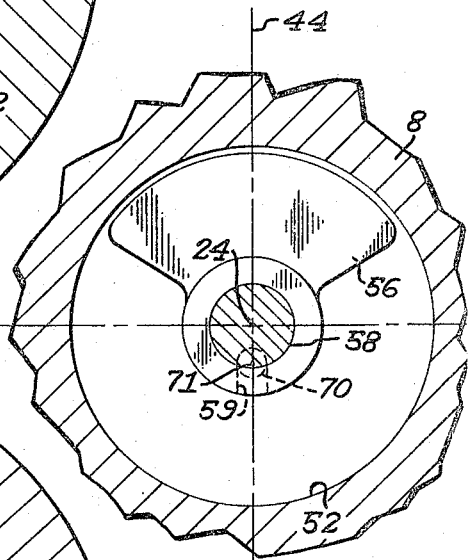
FIG. 4 is a transverse sectional view taken on line 4—4 of FIG. 1.

Shaft extension 70 has an axis 71 which is coincident with shaft axis 69 and defines a cone while moving in synchronism with the orbital movement of star 18. As viewed in FIG. 4, shaft extension axis 71 is in the plane of the line of eccentricity 44 and is in phase relative to the eccentric position of star 18 and this relationship is maintained for all positions of shaft extension 70.

It is of significance that the walls of counterweight slot 59 be in plane surfaces parallel to axis 24 so as to avoid a binding action between shaft extension 71 and counterweight 56. If, for example, a cylindrical hole were provided in counterweight 56 which had an axis coincident with the shaft extension axis 71, a wedging kind of action would cause shaft extension 70 to tend to ride up on the curved surface of the hole and force shaft extension 70 in a radially outward direction out of its conical path. This would tend to cause the binding action referred to.

In the arrangement shown, however, shaft extension 70 abuts one of the flat walls of the slot 59 during operation and there is no resultant force created which would tend to move shaft extension 70 radially inwardly or outwardly out of its conical path so as to create an undesirable binding action.

It may be mentioned that it is within the scope of the invention to make the portion of shaft 70 which is disposed in slot 59 have a square section so that a flat surface of the shaft 70 would engage a flat wall of the slot 59. It has not been found, however, such a construction would have any significant advantages over the construction illustrated.

Figure 2:
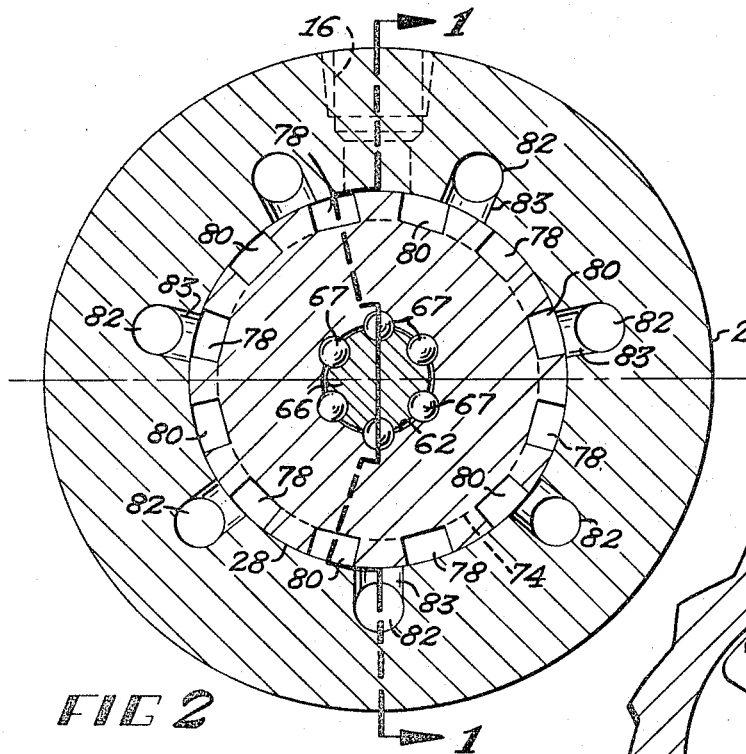
FIG. 2 is a transverse sectional view taken on line 2—2 of FIG. 1.

With regard to the valving for the pump or motor illustrated, valve 28 and casing section 2 are provided with fluid passages through which fluid is conveyed from the port 16 or 17 to the cells 42 of the gerotor and returned to the other of the ports 16 or 17. Port 16 or 17 will be the inlet, and the other the outlet port, depending on the direction of rotation desired for shaft 30. Valve 28, by reason of the shaft connection between it and star 18, will rotate at the same speed as the star 18 but in the opposite direction from the orbiting direction of the star 18. Valve 28 has two axially spaced annular channels 74 and 76 which are axially aligned with ports 16 and 17 and in respective fluid communication therewith. With reference to FIGS. 1, 2 and 3, valve 28 has a plurality of axially extending, circumferentially arranged and spaced passages which are illustrated herein as a set of six axially extending passages 78 which are in fluid communication with annular channel 74 and port 16 and a set of six axially extending passages 80, alternately spaced relative to passages 78, which are in fluid communication with annular channel 76 and port 17. In the fluid pressure device illustrated the passages 78, and the passages 80, are equal in number to the number of teeth 38 on the star 18.

Casing section 2 has a plurality of generally axially extending, circumferentially arranged and spaced passages 82 illustrated as being seven in number which is equal to the number of teeth 36 of the ring member 4. Passages 82 are connected by short radial passages 83 with the interior of casing section 2 to provide for fluid communication between valve passages 78 and 80 and casing passages 82.

Upon rotation of valve 28, each of the passages 78 and 80 therein successively registers in fluid communication with each of the passages 82 in casing section 2. Fluid is supplied to and withdrawn from the gerotor through passages 82 which terminate at points which constitute junctions (see FIG. 3) between the teeth 36 of ring member 4.

Assuming that the fluid pressure device is functioning as a motor, pressurized fluid is introduced through port 16, into annular channel 74, into passages 78 in valve 28, through certain of the passages 82 in casing section 2, and certain gerotor cells 42 which, as viewed in FIG. 3, are on the left side of the line of eccentricity 44. The expansion of the cells 42 on the left side of the line of eccentricity 44 causes star 18 to gyrate in a clockwise direction and causes collapsing of the cells 42 on the right side of the line of eccentricity 44. Fluid from the collapsing cells 42 flows through casing passages 82 on the right side of the line of eccentricity 44, as viewed in FIGS. 2 and 3, through some of the valve passages 80, through valve channel 76 and out through port 17. The above description of fluid flow is only for an instantaneous condition in that the line of eccentricity 44 rotates about the axis 24 of ring member 4. As long as pressurized fluid is admitted through port 16, however, the pressurized fluid will always be admitted to cells 42 on the same side of the line of eccentricity 44 and fluid will always be exhausted on the other side of said line.

During orbiting of star 18 about ring member axis 24, the star rotates in the opposite direction about its own axis 40 at a slower speed. The ratio between the orbiting and rotating speeds is dependent upon the ratio between the ring and star member teeth. If that ratio is seven to six as illustrated herein the rotating speed of the star will be one-sixth of its orbiting speed. By reason of the shaft connection between star 18 and valve 28, valve 28 rotates at the same speed and in the same direction as star 18. Valve 28 is a commutating type valve in that it rotates at the same speed that star 18 rotates but it functions to supply and exhaust fluid to and from the gerotor at the orbiting frequency of the star.

While one embodiment of the invention is described here, it will be understood that it is capable of modification, and that such modification, including a reversal of parts, may be made without departure from the spirit and scope of the invention as defined in the claims.

What I claim is:

1. A drive mechanism comprising relatively stationary frame means, a generally annularly shaped internally toothed ring element having an axis in fixed relation to said frame means, an externally toothed star element having at least one tooth less than said ring element and having an axis, said star element being disposed eccentrically in said ring element for orbital movement about the axis of said ring element and rotational movement about its own axis in the opposite direction from and at a slower speed than said orbital movement during relative movement between said elements, first and second rotatable members supported by said frame means for rotation around said ring element axis, shaft means extending between said star element and said first rotatable member, said shaft means having an axis which intersects said axes of said ring and star elements, universal joint means for respectively connecting said first rotatable member and said star element to said shaft means to provide for rotational movement of said first rotatable member in synchronism with said rotational movement of said star element, said second rotatable member having a radially extending slot with walls extending parallel to said ring element axis, said shaft means including a shaft portion which is coaxial relative to said shaft means axis and extends into said slot to provide rotational movement of said second rotatable member in synchronism with said orbital movement of said star element, said shaft portion having a transverse dimension substantially equal to the width of said slot and being rotatable relative to either said shaft means axis or to said rotatable member or both.

2. A drive mechanism according to claim 1 wherein said first rotatable member and said star element each have a bore concentric relative to its own axis with said shaft means extending between and into said bores.

3. A drive mechanism according to claim 1 wherein said shaft portion is of circular cross-section with a diameter that is substantially equal to the width of said slot.

4. A drive mechanism according to claim 3 wherein said shaft portion is rotatable relative to said shaft means axis and to said second rotatable member.

5. A drive mechanism according to claim 1 wherein said first and second rotatable members are on opposite sides of said ring element.

6. A drive mechanism according to claim 1 wherein said second rotatable member is eccentrically weighted in the diametrically opposite direction from which said star element is eccentrically disposed in said ring element.

References Cited by the Examiner

UNITED STATES PATENTS

| Re. 25,126 | 2/1962 | Charlson | 91—56 |
| Re. 25,291 | 12/1962 | Charlson | 91—56 |
| 1,363,451 | 12/1920 | Blackman | 103—130 |
| 3,087,436 | 4/1963 | Dettlof et al. | 103—126 |
| 3,233,524 | 2/1966 | Charlson | 91—56 |
| 3,261,235 | 7/1966 | Henkel | 91—56 |
| 3,270,681 | 9/1966 | Charlson | 103—126 |
| 3,277,833 | 10/1966 | Hudgens | 103—130 |

DONLEY J. STOCKING, *Primary Examiner.*

W. J. GOODLIN, *Assistant Examiner.*